J. H. Coleman,

Cultivator.

No. 86,003.  Patented Jan. 19, 1869.

Witnesses:
Wm. A. Morgan
G. C. Cotton

Inventor:
J. H. Coleman
Per. Murry
Attorney

J. H. COLEMAN, OF COLUMBIA, MISSOURI.

Letters Patent No. 86,003, dated January 19, 1869.

IMPROVED CULTIVATOR.

The Schedule referred to in these Letters Patent and making part of the same.

*To all whom it may concern:*

Be it known that I, J. H. COLEMAN, of Columbia, in the county of Boone, and State of Missouri, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a new and improved cultivator for plowing or cultivating crops grown in hills or drills.

It consists in a novel construction and arrangement of the plows or shares, manner of applying the same, &c., as hereinafter fully shown and described, whereby a very economical and desirable cultivator is obtained.

In the accompanying sheet of drawings—

A represents a rectangular frame, which is mounted on the wheels B B, and has a draught-pole, C, secured to its front end by a pivot-bolt, $a$.

The rear end of the draught-pole has a hook, $b$, attached to it, which is fitted over a segment-bar, D, attached to a central bar, $c$, of the frame.

Figure 1:
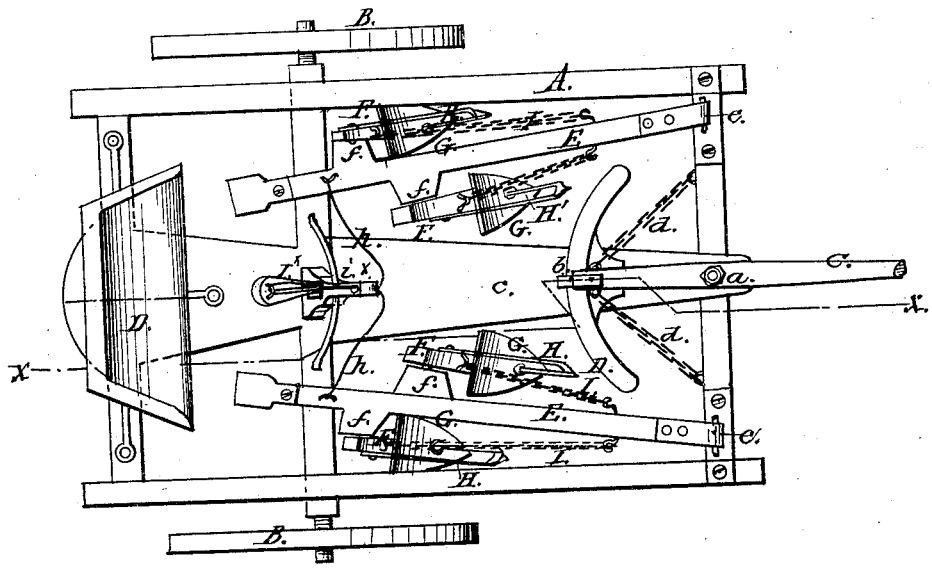
Figure 1 is a plan or top view of my invention.

The lateral adjustment allowed the draught-pole by this connection is limited by the chains $d\ d$, attached, one to each side of it, and to the front end of the frame A, as shown in fig. 1, one chain being taken up and the other let out, as occasion may require.

D is a driver's seat on the rear part of the frame A, and

E E are two plow-beams, the front ends of which are attached, by hinges $c\ c$, to the front cross-bar of the frame A, said hinges allowing of a vertical movement of the plow-beams.

Each plow-beam, E, has two standards, F F, attached to it by pivot-bolts, $f$, a standard being at each side of each beam, a plow or share, G, being secured to the lower end of each standard, and each standard and share having a curved coulter, H, attached.

Figure 2:
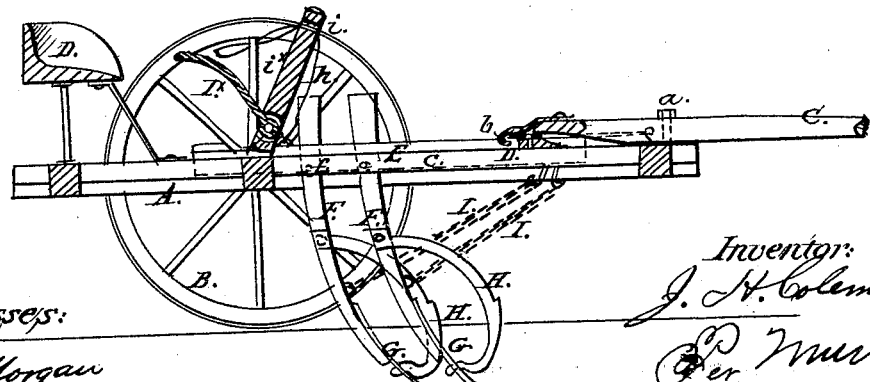
Figure 2 is a side sectional view of the same, taken in the line $x\ x$, fig. 1.

These standards are secured at a greater or less angle by means of chains I, which may be taken up and let out as required. (See fig. 2.)

Each plow-beam has a cord, $h$, attached to it, and these cords pass up through a hole, $i$, in the upper part of a standard, $i^\times$, on the frame A, and are attached to a treadle, $I^\times$.

By this arrangement, both plow-beams, and, consequently, all the plows or shares, may be raised simultaneously out of the ground when required.

The plows or shares are kept down to their work by the pressure of the driver's feet on the rear ends of the plow-beams.

The device is extremely simple and efficient, and may be managed and operated by the driver with the greatest facility.

Having thus described my invention,

I claim as new, and desire to secure by Letters Patent—

1. The arrangement of the curved coulters H upon the standards F and the front side of the shares G, as herein shown and described.

2. The described arrangement of the hinged plow extending above the axle, the beams E, the treadle I, cords $h$, and standard $i^\times$, whereby the plows are held down by the pressure of the driver's feet upon the extended beams, and raised simultaneously above the ground by the same pressure applied to the treadle $I^\times$, as herein shown and described.

J. H. COLEMAN.

Witnesses:
M. D. COOK,
D. G. SEARCY.